United States Patent
Wang

(10) Patent No.: US 11,979,686 B2
(45) Date of Patent: May 7, 2024

(54) METHOD AND SYSTEM FOR SOFTWARE-DEFINED CAMERA AND CAMERA

(71) Applicant: HUAWEI TECHNOLOGIES CO., LTD., Guangdong (CN)

(72) Inventor: Zhenyu Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 17/143,359

(22) Filed: Jan. 7, 2021

(65) Prior Publication Data

US 2021/0136329 A1 May 6, 2021

Related U.S. Application Data

(63) Continuation of application No. PCT/CN2019/094126, filed on Jul. 1, 2019.

(30) Foreign Application Priority Data

Aug. 1, 2018 (CN) .......................... 201810866327.5

(51) Int. Cl.
- *H04N 7/18* (2006.01)
- *G06F 8/65* (2018.01)
- *G06F 8/71* (2018.01)
- *G06V 20/52* (2022.01)

(52) U.S. Cl.
CPC .............. *H04N 7/185* (2013.01); *G06F 8/65* (2013.01); *G06F 8/71* (2013.01); *G06V 20/52* (2022.01); *G06V 2201/07* (2022.01)

(58) Field of Classification Search
CPC .... G06F 8/60; G06F 8/65; G06F 8/71; G06V 20/52; G06V 2201/07; H04N 5/232; H04N 5/23225; H04N 7/181; H04N 7/183; H04N 7/185
See application file for complete search history.

(56) References Cited

U.S. PATENT DOCUMENTS

| 2010/0238289 A1* | 9/2010 | Wu .......................... B60R 1/12 348/148 |
| 2012/0072900 A1 | 3/2012 | Matsushita |

(Continued)

FOREIGN PATENT DOCUMENTS

| CN | 101753524 A | 6/2010 |
| CN | 201690520 U | 12/2010 |

(Continued)

*Primary Examiner* — Maria E Vazquez Colon
(74) *Attorney, Agent, or Firm* — HUAWEI TECHNOLOGIES CO., LTD.

(57) ABSTRACT

A method and system for a software-defined camera. A device management center stores an intelligent application used for intelligent video analysis and stores intelligent application deployment files for various surveillance scenarios. The device management center sends a corresponding deployment file to a camera based on a location of a smart camera and an intelligent video analysis function that needs to be implemented. The camera obtains a corresponding intelligent application from the device management center based on a list of intelligent applications in the deployment file, to implement an intelligent video analysis function required in the surveillance scenario.

19 Claims, 9 Drawing Sheets

| Camera software V1 | Camera software V2 | Camera software V3 | Camera software V4 |
|---|---|---|---|
| Shooting + Access protocol | Shooting + Access protocol | Shooting + Access protocol | Shooting + Access protocol |
| | + Facial recognition | + Facial recognition + License plate recognition | + Facial recognition + License plate recognition ... |

(56) References Cited

U.S. PATENT DOCUMENTS

| | | | |
|---|---|---|---|
| 2013/0063476 A1* | 3/2013 | Kingsley | G05B 23/02 |
| | | | 345/619 |
| 2014/0130032 A1 | 5/2014 | Lipinski et al. | |
| 2014/0300764 A1 | 10/2014 | Chiang et al. | |
| 2015/0009325 A1* | 1/2015 | Kardashov | H04N 23/617 |
| | | | 348/143 |
| 2015/0022666 A1* | 1/2015 | Kay | H04L 65/65 |
| | | | 348/159 |
| 2017/0310886 A1 | 10/2017 | Hurst | |

FOREIGN PATENT DOCUMENTS

| | | | |
|---|---|---|---|
| CN | 102118640 A | | 7/2011 |
| CN | 102915249 A | * | 2/2013 |
| CN | 103179381 A | | 6/2013 |
| CN | 103325121 A | | 9/2013 |
| CN | 104111853 A | | 10/2014 |
| CN | 104184986 A | | 12/2014 |
| CN | 105068831 A | * | 11/2015 |
| CN | 105872106 A | * | 8/2016 |
| CN | 105959644 A | | 9/2016 |
| CN | 106020884 A | | 10/2016 |
| CN | 106210132 A | | 12/2016 |
| CN | 107179918 A | | 9/2017 |
| CN | 107347126 A | | 11/2017 |
| CN | 108108595 A | | 6/2018 |
| JP | 2017139528 A | | 8/2017 |
| KR | 20090064674 A | * | 12/2017 |

* cited by examiner

METHOD AND SYSTEM FOR SOFTWARE-DEFINED CAMERA AND CAMERA

CROSS-REFERENCE TO RELATED APPLICATIONS

This application is a continuation of International Application No. PCT/CN2019/094126, filed on Jul. 1, 2019, which claims priority to Chinese Patent Application No. 201810866327.5, filed on Aug. 1, 2018. The disclosures of the aforementioned applications are hereby incorporated by reference in their entireties.

TECHNICAL FIELD

This application relates to the video surveillance field, and in particular, to a method and system for using a software-defined camera, and a camera.

BACKGROUND

Currently, with development of video surveillance technologies, surveillance is developing from simple video recording to intelligence. This trend of intelligence also significantly affects development of front-end cameras. Currently, cameras are becoming more intelligent. With the emergence of smart cameras, a problem that a video relies heavily on manual troubleshooting is resolved, and timeliness of a response to an intelligent recognition result is effectively ensured. Therefore, the smart cameras hold great promise in various fields such as public safety, transportation, and industrial production.

In the prior art, a smart camera is generally delivered by integrating software and hardware, and a problem is rectified or a capability is enhanced through an overall upgrade of the software. However, there is a great problem for the smart camera that is delivered by using a single software package and upgraded in an overall replacement manner. For example, an existing smart camera has more functions, but does not need so many functions in a specific scenario. In this case, a large amount of storage space and processing capabilities are wasted. In addition, if different software packages are released for different scenarios, software versions are difficult to manage as a quantity of scenarios increases.

SUMMARY

In view of this, embodiments of this application provide a method and system for a software-defined camera, and a camera, to implement on-demand deployment and independent replacement of a camera function on a camera with limited resources and specific hardware, and meet diversified user scenarios by using rich intelligent applications, in other words, implement a function of the software-defined camera.

To achieve the foregoing objective, according to a first aspect, an embodiment of this application provides a method for a software-defined camera. In the method, a device management center sends a deployment file to a smart camera. The deployment file includes intelligent application configuration information applicable to a specific surveillance scenario. After receiving the deployment file, the smart camera sends, based on the intelligent application configuration information in the deployment file, a request message for obtaining an intelligent application to the device management center. The device management center sends a corresponding intelligent application to the smart camera based on a request of the smart camera. According to the method for a software-defined camera, provided in this embodiment of this application, a corresponding smart camera does not need to be developed for each scenario, but only corresponding intelligent applications need to be generated for different surveillance scenarios. This improves flexibility and universality of the smart camera, and can reduce development costs of the smart camera.

The intelligent application configuration information in the deployment file may include information such as software identifiers (for example, a software name, a software number, and the like), a software version number, a storage address, and a display window that are of an intelligent application and are required in the specific surveillance scenario, and further include information, for example, a dependency relationship between intelligent applications.

Optionally, before the device management center sends the deployment file to the smart camera, the device management center receives an intelligent application sent from outside. The device management center is used as a platform for storing intelligent applications, so that each intelligent application developer can upload various intelligent analysis algorithm programs or intelligent application software to the device management center, and this is not limited to only intelligent applications developed by device management center vendors. This enhances openness and compatibility of the device management center.

Optionally, before the device management center sends the deployment file to the smart camera, the device management center may further generates a deployment file for each surveillance scenario. The device management center may organize and orchestrate intelligent applications according to a service requirement of a surveillance scenario, to generate a deployment file for the surveillance scenario. The deployment file includes information about an intelligent application required by the surveillance scenario and a dependency relationship between the intelligent applications. The device management center can flexibly generate the deployment file according to a requirement of the surveillance scenario. This expands applicable scenarios for the device management center and intelligent applications stored in the device management center.

Optionally, when the device management center receives a new version of an intelligent application, the device management center may update information about an intelligent application in the deployment file that includes the intelligent application, and send an updated deployment file to the smart camera. Alternatively, the device management center may send, to the smart camera, an intelligent application update command that includes the updated information about the intelligent application, to instruct the smart camera to obtain an intelligent application of the new version. In this way, the smart camera can obtain an intelligent application of a latest version, and can timely update an intelligent video analysis capability.

Optionally, if there is a new service requirement for a surveillance scenario, and an intelligent application executed in the surveillance scenario needs to be changed, the device management center may update information about an intelligent application in a deployment file corresponding to the surveillance scenario, and send an updated deployment file to the smart camera. Alternatively, the device management center may send, to the smart camera, an intelligent application update command that includes the updated information about the intelligent application, to instruct the smart camera to obtain an intelligent application of the new version. In this way, the smart camera can obtain an intelligent application of a latest version, and can timely update an intelligent video analysis capability.

Optionally, obtaining, by the smart camera, an intelligent application from the device management center based on the deployment file includes: obtaining, by the smart camera based on the intelligent application configuration information in the deployment file, a list of intelligent applications included in the deployment file; then comparing the list of the intelligent applications included in the deployment file with an existing intelligent application of the smart camera, to identify an intelligent application that needs to be obtained; and requesting, from the device management center, the intelligent application that needs to be obtained. When the smart camera receives a deployment file for a surveillance scenario for the first time, the smart camera may not store any corresponding intelligent application, and needs to obtain all intelligent applications included in the deployment file. If the smart camera receives a deployment file that is updated because a version of an intelligent application is updated or anew service is added to a surveillance scenario, the smart camera only needs to identify an intelligent application whose version changes, and then requests to download, from the device management center, the intelligent application whose version changes; or the smart camera identifies a new intelligent application, and then requests to download the new intelligent application from the device management center.

If the smart camera identifies, when comparing the list of the intelligent application included in the deployment file with the existing intelligent application of the smart camera, that some intelligent applications are deleted from the deployment file, the smart camera stops the deleted intelligent applications, and deletes the identified deleted intelligent applications from the smart camera. The smart camera may select a corresponding operation based on a difference between the intelligent applications in the deployment file and the intelligent application of the smart camera. In addition, when an intelligent application for a surveillance scenario changes, the smart camera can find a corresponding intelligent application by comparing only a new deployment file with the existing intelligent application of the smart camera. This simplifies an update process of the smart camera, and enhances deployment flexibility of the smart camera.

Optionally, the smart camera may receive an intelligent application update command sent by the device management center, and send, to the device management center based on intelligent application information in the intelligent application update command, a request message for obtaining a corresponding intelligent application.

According to a second aspect, an embodiment of this application provides a method for a software-defined camera. In the method, a device management center sends a deployment file to a smart camera, where the deployment file includes intelligent application configuration information applicable to a specific surveillance scenario; and the device management center receives a request message for obtaining an intelligent application by the smart camera, and then sends the requested intelligent application to the smart camera. In the foregoing manner, the device management center sends the deployment file to the smart camera and then sends the corresponding intelligent application, to control an intelligent analysis function implemented by the smart camera and a surveillance scenario to which the smart camera is applicable. This simplifies an intelligent application deployment process of a camera, and enables the smart camera to be applicable to various surveillance scenarios.

The intelligent application configuration information in the deployment file may include information such as software identifiers (for example, a software name, a software number, and the like), a software version number, a storage address, and a display window that are of an intelligent application and are required in the specific surveillance scenario, and further include information, for example, a dependency relationship between intelligent applications.

Optionally, before the device management center sends the deployment file to the smart camera, the device management center receives an intelligent application sent from outside. In this way, the device management center can store a latest intelligent application, so that the device management center is more open.

Optionally, before the device management center sends the deployment file to the smart camera, the device management center may further generates a deployment file for each surveillance scenario. The device management center can flexibly generate the deployment file according to a requirement of the surveillance scenario. This expands applicable scenarios for intelligent applications.

Optionally, when the device management center receives a new version of an intelligent application, the device management center may update information about an intelligent application in the deployment file that includes the intelligent application, and send an updated deployment file to the smart camera. Alternatively, the device management center may send, to the smart camera, an intelligent application update command that includes the updated information about the intelligent application, to instruct the smart camera to obtain an intelligent application of the new version. In this way, the smart camera can obtain an intelligent application of a latest version, and can timely update an intelligent video analysis capability.

Optionally, if there is a new service requirement for a surveillance scenario, and an intelligent application that needs to be executed needs to be changed, the device management center may update information about an intelligent application in a deployment file corresponding to the surveillance scenario, and send an updated deployment file to the smart camera. Alternatively, the device management center may send, to the smart camera, an intelligent application update command that includes information about a new intelligent application, to instruct the smart camera to obtain the new intelligent application. In this way, the smart camera can obtain the new intelligent application, to meet the new service requirement for the surveillance scenario.

According to a third aspect, an embodiment of this application provides a method for a software-defined camera. In the method, a smart camera receives a deployment file sent by a device management center, where the deployment file includes intelligent application configuration information applicable to a specific surveillance scenario; the smart camera obtains, based on the intelligent application configuration information in the deployment file, a list of intelligent applications included in the deployment file, and sends a request message for downloading an intelligent application to the device management center; and the smart camera receives an intelligent application sent by the device management center. In the foregoing manner, the smart camera obtains, by analyzing a deployment file for a specific application scenario, a list of intelligent applications required by the application scenario, and obtains a corresponding intelligent application from the device management center, to implement a required intelligent video analysis function. This enables the smart camera to flexibly expand functions that can be implemented by the smart camera, and expands applicable scenarios for the smart camera.

The intelligent application configuration information in the deployment file may include information such as software identifiers (for example, a software name, a software number, and the like), a software version number, a storage address, and a display window that are of an intelligent application and are required in the specific surveillance scenario, and further include information, for example, a dependency relationship between intelligent applications. After receiving the intelligent application, the smart camera executes the intelligent application based on the dependency relationship between the intelligent applications in the deployment file. Optionally, when executing the intelligent application, the smart camera may control the intelligent application to read video data in a read-only sharing mode.

Optionally, obtaining, by the smart camera, an intelligent application from the device management center based on the deployment file includes: obtaining, by the smart camera based on the intelligent application configuration information in the deployment file, information about intelligent applications included in the deployment file; comparing a list of intelligent applications included in the deployment file with an existing intelligent application of the smart camera, to identify an intelligent application whose version changes; and requesting to download, from the device management center, the intelligent application whose version changes; or identifying a new intelligent application, and requesting to download the new intelligent application from the device management center. If the smart camera identifies, when comparing the list of the intelligent applications included in the deployment file with the existing intelligent application of the smart camera, that some intelligent applications are deleted from the list of the intelligent applications included in deployment file, the smart camera may stop the deleted intelligent applications, and deletes the identified deleted intelligent applications from the smart camera. The smart camera may select a corresponding operation based on a difference between the list of the intelligent applications in the deployment file and the intelligent application of the smart camera. In this way, when an intelligent application for a surveillance scenario changes, the smart camera can find a corresponding intelligent application by comparing a new deployment file with the existing intelligent application of the smart camera. This simplifies an update process of the smart camera, and expands deployment scenarios for the smart camera.

Optionally, the smart camera may: receive an intelligent application update command sent by the device management center; identify, based on information, in the intelligent application update command, about an intelligent application that needs to be updated, an intelligent application that needs to be obtained; and send, to the device management center, a request message for obtaining the intelligent application that needs to be obtained.

According to a fourth aspect, an embodiment of this application provides a device management center. The device management center has a function of implementing the method in the second aspect. The function may be implemented by hardware, or may be implemented by hardware by executing corresponding software. The hardware or the software includes one or more modules corresponding to the function.

According to a fifth aspect, an embodiment of this application provides a device management center, including a processor, a memory, a bus, and a communications interface. The memory is configured to store a computer-executable instruction. The processor and the memory are connected by using the bus. When the device management center runs, the processor executes the computer-executable instruction in the memory, to enable the device management center to perform the method for a software-defined camera according to any one of the second aspect or the possible implementations of the second aspect.

According to a sixth aspect, an embodiment of this application provides a computer-readable storage medium. The computer-readable storage medium stores an instruction. When the instruction is run on a computer, the computer is enabled to perform the method for a software-defined camera according to any one of the second aspect or the possible implementations of the second aspect.

According to a seventh aspect, an embodiment of this application provides a computer program product including an instruction. When the computer program product runs on a computer, the computer is enabled to perform the method for a software-defined camera according to any one of the second aspect or the possible implementations of the second aspect.

For a technical effect brought by any one of the designs of the fourth aspect to the seventh aspect, refer to technical effects brought by different designs in the second aspect. Details are not described herein again.

According to an eighth aspect, an embodiment of this application provides a smart camera. The smart camera has a function of implementing the method in the third aspect. The function may be implemented by hardware, or may be implemented by hardware by executing corresponding software. The hardware or the software includes one or more modules corresponding to the function.

According to a ninth aspect, an embodiment of this application provides a smart camera, including a processor, a memory, a bus, and a communications interface. The memory is configured to store a computer-executable instruction. The processor and the memory are connected by using the bus. When the smart camera device management center runs, the processor executes the computer-executable instruction in the memory, to enable the smart camera to perform the method for a software-defined camera according to any one of the third aspect or the possible implementations of the third aspect.

According to a tenth aspect, an embodiment of this application provides a computer-readable storage medium. The computer-readable storage medium stores an instruction. When the instruction is run on a camera, the camera is enabled to perform the method for a software-defined camera according to any one of the third aspect or the possible implementations of the third aspect.

According to an eleventh aspect, an embodiment of this application provides a computer program product including an instruction. When the computer program product runs on a camera, the camera is enabled to perform the method for a software-defined camera according to any one of the third aspect or the possible implementations of the third aspect.

For a technical effect brought by any one of the designs of the eighth aspect to the eleventh aspect, refer to technical effects brought by different designs in the third aspect. Details are not described herein again.

According to a twelfth aspect, an embodiment of this application provides a system for a software-defined camera, including the device management center according to any one of the foregoing aspects and the smart camera according to any one of the foregoing aspects.

These aspects or other aspects of this application are clearer and comprehensible in descriptions of the following embodiments.

DESCRIPTION OF EMBODIMENTS

The following describes the technical solutions in the embodiments of this application with reference to the accompanying drawings in the embodiments of this application. A specific operation method in method embodiments may also be applied to apparatus embodiments.

Currently, video surveillance is widely used in the fields such as industry, security, and daily life, and video surveillance cameras are constantly becoming intelligentized. There are some problems for a current smart camera that is delivered by using a single software package and upgraded in an overall replacement manner.

Figure 1:
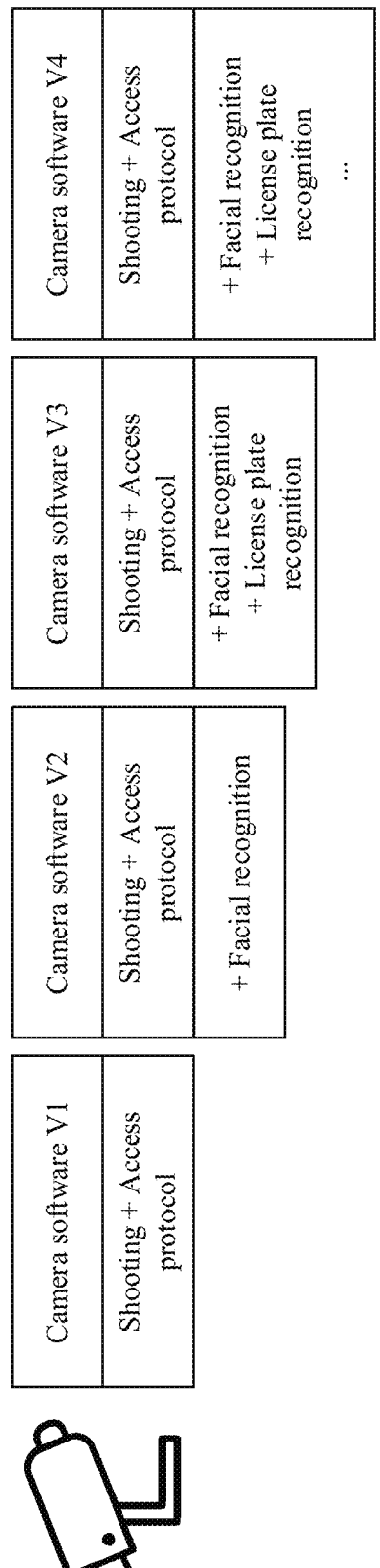
FIG. 1 is a schematic diagram of a camera software update manner in the prior art.

FIG. 1 shows a camera software update manner in the prior art; In this mode, some new intelligent analysis functions are added to each version of camera software compared with a previous version. In this way, in a later version of the software, more functions are integrated into a smart camera, but generally, not many functions are used at the same time in a surveillance scenario. Overall delivery using one software package causes a waste of storage and memory space. However, hardware resources of the camera are usually limited and may eventually exceed a processing capability of the camera.

Figure 2:
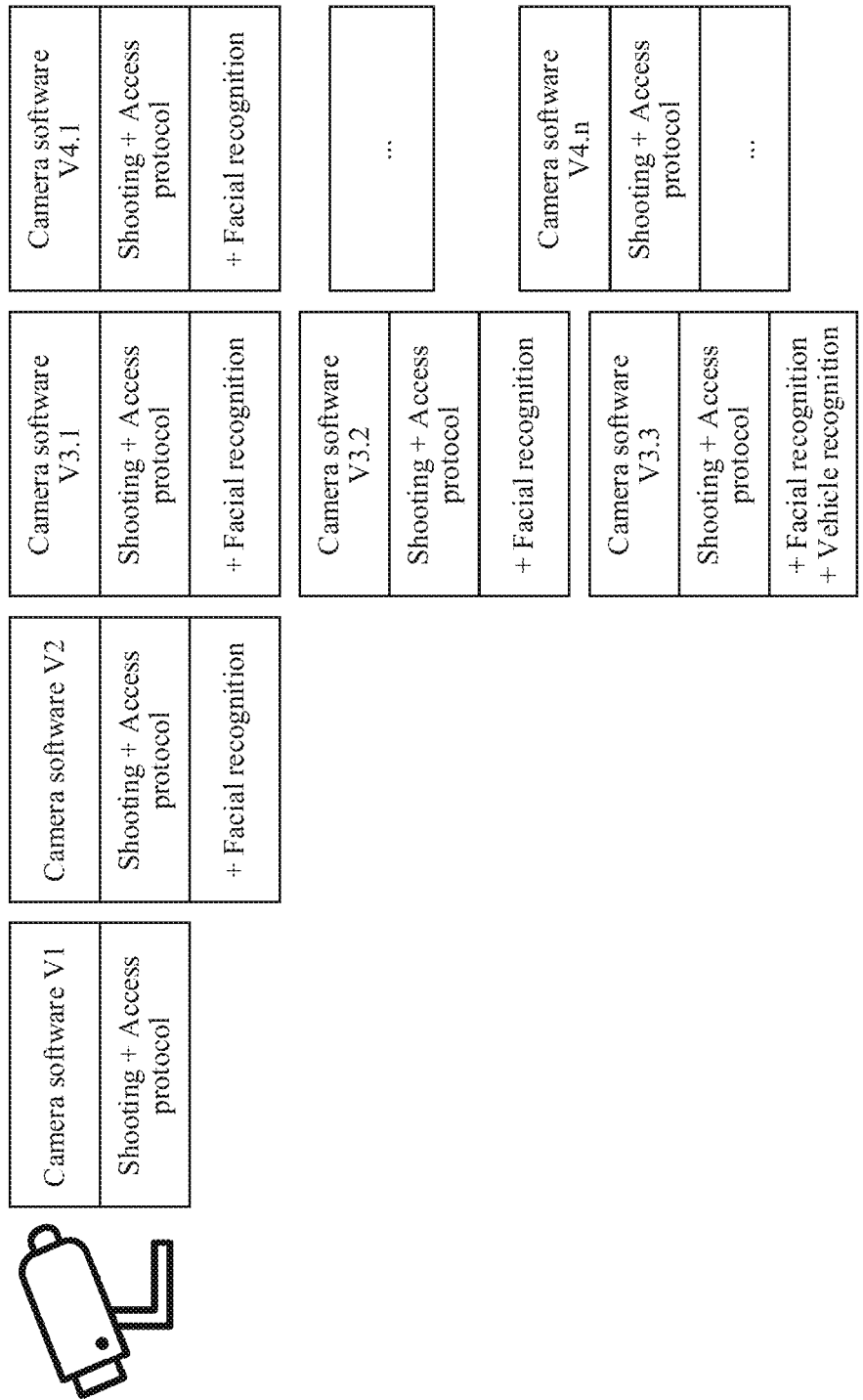
FIG. 2 is a schematic diagram of another camera software update manner in the prior art.

FIG. 2 shows another camera software update manner in the prior art. In this manner, different software packages are released for different scenarios. However, software versions are difficult to manage as a quantity of scenarios increases.

In addition, an intelligent analysis function integrated in a smart camera may not achieve an expected recognition effect during initial integration due to different environments, and intelligent analysis software needs to be continuously optimized. However, a basic image collection function of the smart camera is interrupted when the software is replaced as a whole. Therefore, it is difficult to implement fast algorithm iteration.

In addition, one vendor cannot provide all intelligent analysis applications for diverse application scenarios. One smart camera may need to integrate intelligent analysis algorithms of a plurality of vendors. If a single software manner integrating the algorithms of the plurality of vendors is used for delivery, multi-vendor development integration needs to be performed before software delivery. This not only prolongs a product delivery time, but also increases algorithm coupling between the vendors.

To resolve problems in deployment and update of intelligent analysis software in an existing smart camera, the embodiments of this application provide a method and system for a software-defined camera, and a corresponding camera, to allow separation of a basic camera function and an intelligent analysis function of the smart camera, further support centralized management of the intelligent analysis software, and facilitate flexible combination and on-demand deployment, performed based on a service scenario, of the intelligent analysis software of the smart camera.

Figure 3:
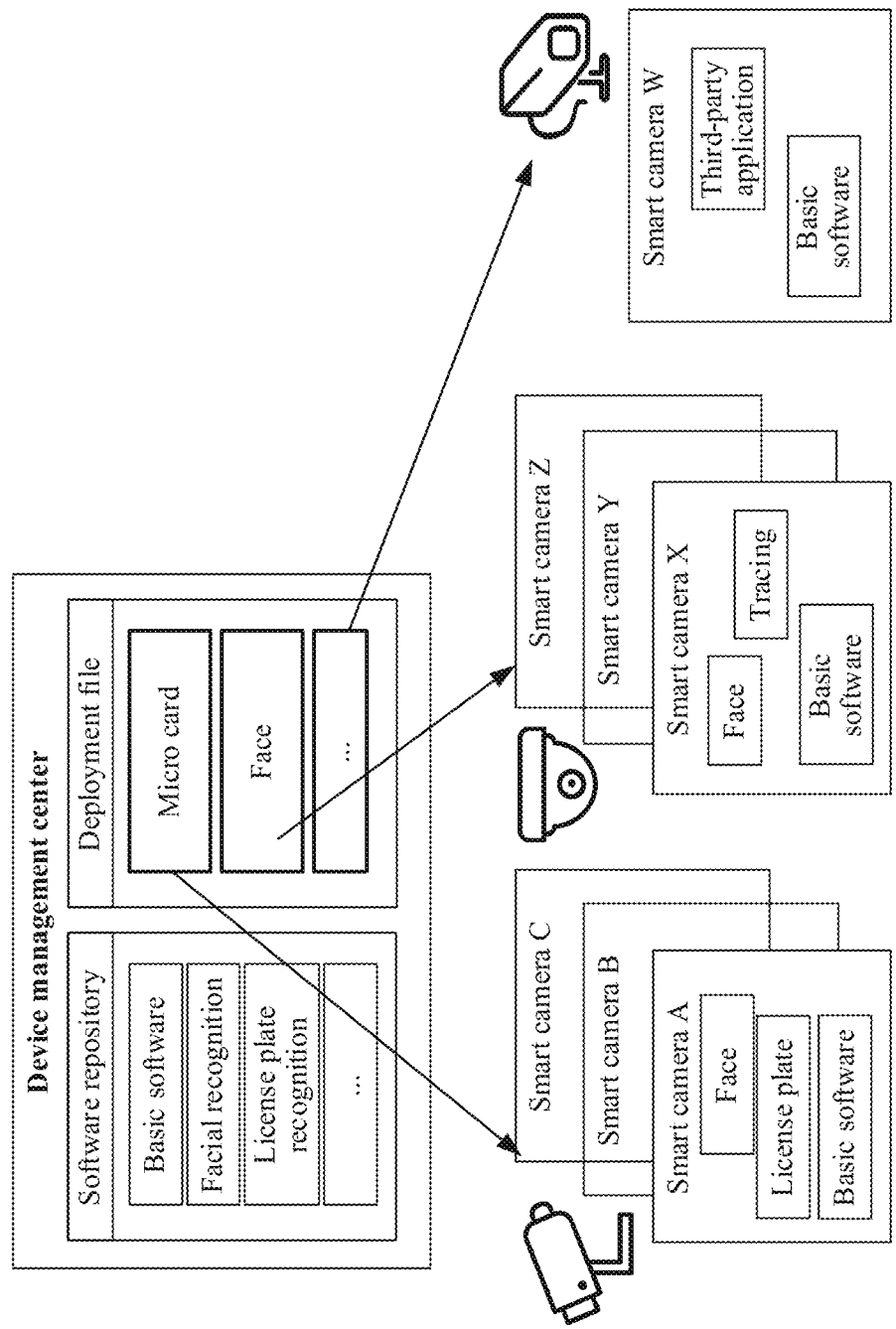
FIG. 3 is a schematic diagram of an architecture of a system for a software-defined camera according to an embodiment of this application.

FIG. 3 shows a possible system for implementing a software-defined camera according to an embodiment of this application. The system includes a device management center and several smart cameras.

The device management center in FIG. 3 is configured to manage smart cameras within a scope of the device management center, and may control intelligent analysis functions executed by the smart cameras within a scope of the device management center. The device management center includes a software repository that stores intelligent applications, and deployment files of smart cameras in various application scenarios.

The intelligent application may be a program corresponding to an algorithm in intelligent video analysis, or may be software that can run independently, or may be an application including complete intelligent video analysis. In an application scenario, a complete intelligent application may perform intelligent analysis to implement a required function, or a plurality of intelligent applications may cooperate to implement a required function.

The deployment file is a file used to describe intelligent application configuration information in a specific surveillance scenario, and is used for automatic software deployment and adjustment of a smart camera. The intelligent application configuration information in the deployment file may include information such as a software identifier (for example, a software name or a software number), a storage address of software, and a display window. Different application scenarios may have different requirements. Therefore, different intelligent applications or a combination of intelligent applications is required to implement a corresponding requirement. The deployment file is configuration information used to describe intelligent applications required in different application scenarios and a dependency relationship between the intelligent applications.

The smart camera in FIG. 3 may be configured to: collect image data, execute an intelligent application deployed on the smart camera, and perform complex analysis and processing on a collected image, to obtain an intelligent analysis result. The smart camera in this embodiment of this application may further perform operations such as software downloading, running, uninstallation, and upgrade according to an instruction of the device management center. Each intelligent application independently performs intelligent analysis, to jointly complete an intelligent analysis service of the camera for a scenario.

One device management center can manage one or more smart cameras. A plurality of smart cameras can be deployed in a same surveillance scenario or in a plurality of surveillance scenarios. The device management center may send corresponding deployment files to different smart cameras based on different surveillance scenarios where the smart cameras are located and different intelligent analysis functions that need to be implemented, so that the different smart cameras obtain different intelligent applications and implement corresponding intelligent analysis functions.

FIG. 3 describes an overall architecture provided in this embodiment of this application. In the architecture shown in FIG. 3, the software repository of the device management center stores various intelligent applications, and the device management center further stores deployment files corresponding to various surveillance scenarios. The device management center may send a different intelligent application to a smart camera based on a different surveillance scenario to which the smart camera is applicable, and upgrade the intelligent application of the smart camera when necessary.

Optionally, the device management center in this embodiment of this application may be disposed on an independent server, and the server is connected to the smart camera within a scope of the device management center. Alternatively, the device management center may be deployed on a cloud server in a form of software. This is not limited in this embodiment of this application.

If the device management center is deployed on a cloud, the software repository of the device management center may be distributed on an edge node server of a content delivery network (CDN). The software repository and the deployment file of the device management center may be stored in a distributed manner. The smart camera may obtain a required intelligent application nearby.

Optionally, the software repository and the deployment file in the device management center in this embodiment of this application may be deployed in a distributed manner. In other words, the deployment file and the software repository storing intelligent applications may be separately stored. The deployment file may record an identifier of an intelligent application and a corresponding storage address. The smart camera may obtain the intelligent application based on the storage address of the intelligent application.

Figure 4:
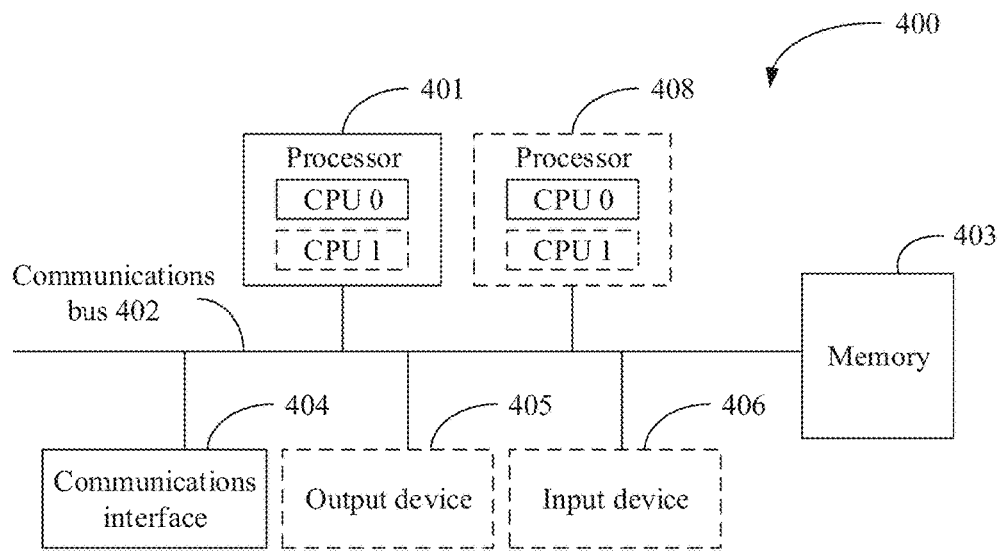
FIG. 4 is a schematic diagram of a structure of a computer device according to an embodiment of this application.

For example, as shown in FIG. 4, the device management center in FIG. 3 may be implemented by using a computer device in FIG. 4.

FIG. 4 is a schematic diagram of a hardware structure of a computer device according to an embodiment of this application. The computer device 400 includes at least one processor 401, a communications bus 402, a memory 403, and at least one communications interface 404.

The processor 401 may be a general-purpose central processing unit (central processing unit, CPU), a microprocessor, an application-specific integrated circuit (application-specific integrated circuit, ASIC), or one or more integrated circuits configured to control program execution of the solutions of this application.

The communications bus 402 may include a path used to transmit information between the foregoing components.

The communications interface 404 is an apparatus using any transceiver, and is configured to communicate with another device or a communications network, for example, an Ethernet, a radio access network (radio access network, RAN), or a wireless local area network (wireless local area networks, WLAN). A communications mode may be selected based on an actual application scenario. This is not limited in this application.

The memory 403 may be a read-only memory (read-only memory, ROM) or another type of static storage device that can store static information and instructions, or a random access memory (random access memory, RAM) or another type of dynamic storage device that can store information and instructions. Alternatively, the memory 403 may be an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory 403 is not limited thereto. The memory may exist independently, and is connected to the processor through the bus. The memory may alternatively be integrated with the processor.

The memory 403 is configured to store application program code for performing the solutions in this application, and the application program code is executed under control of the processor 401. The processor 401 is configured to execute the application program code stored in the memory 403, to implement a service continuity implementation method provided in the following embodiments of this application.

During a specific implementation, in an embodiment, the processor 401 may include one or more CPUs, for example, a CPU 0 and a CPU 1 in FIG. 4.

During a specific implementation, in an embodiment, the computer device 400 may include a plurality of processors, for example, the processor 401 and a processor 408 in FIG. 4. Each of the processors may be a single-core (single-core) processor or a multi-core (multi-core) processor. The processor herein may be one or more devices, circuits, and/or processing cores for processing data (for example, a computer program instruction).

During a specific implementation, in an embodiment, the computer device 400 may further include an output device 405 and an input device 406. The output device 405 communicates with the processor 401, and may display information in a plurality of manners. For example, the output device 405 may be a liquid crystal display (liquid crystal display, LCD), a light emitting diode (light emitting diode, LED) display device, a cathode ray tube (cathode ray tube, CRT) display device, a projector (projector), or the like. The input device 406 communicates with the processor 401, and may receive a user input in a plurality of manners. For example, the input device 406 may be a mouse, a keyboard, a touchscreen device, a sensor device, or the like.

The computer device 400 may be a general-purpose computer device or a dedicated computer device. During a specific implementation, the computer device 400 may be a desktop computer, a portable computer, a network server, a wireless terminal device, an embedded device, or a device having a structure similar to that in FIG. 4. A type of the computer device 400 is not limited in this embodiment of this application.

Figure 5:
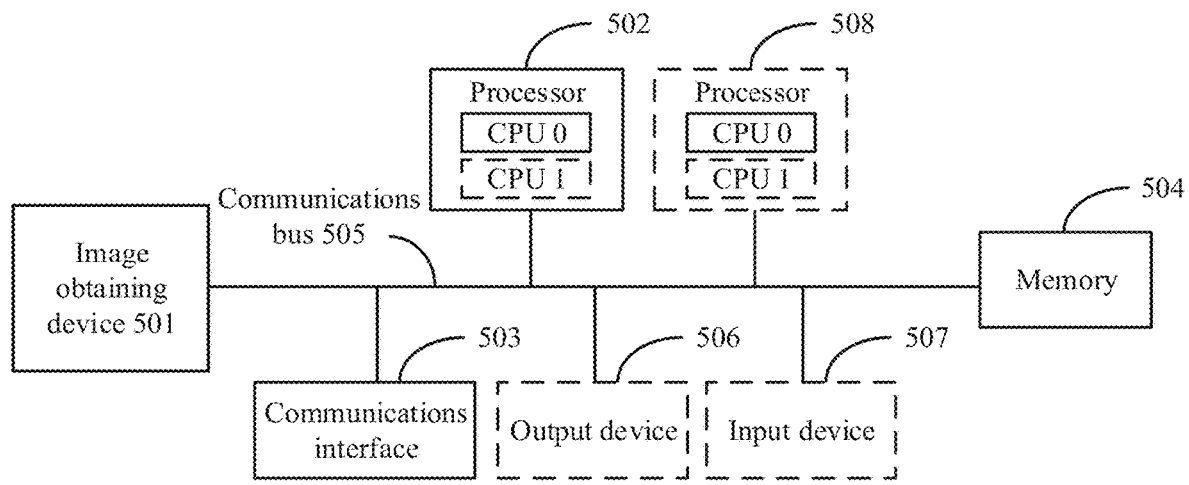
FIG. 5 is a schematic diagram of a structure of a camera according to an embodiment of this application.

FIG. 5 is a schematic diagram of a structure of a possible smart camera according to an embodiment of this application.

The smart camera includes an image obtaining device 501, a processor 502, a memory 504, a communications bus 505, and at least one communications interface 503.

The image obtaining device 501 of the smart camera 500 is configured to collect image data, and may include a lens, an image collection module, and an image processing module. The lens may be a fixed-aperture lens, an auto-aperture lens, an auto-zoom lens, an auto-zoom lens, or the like. The image collection module is configured to record a captured optical signal. The image collection module is usually any optical sensor, for example, a complementary metal oxide semiconductor (Complementary Metal Oxide Semiconductor, CMOS), a charge-coupled device (Charge-coupled Device, CCD), or a component that implements a similar function.

Optionally, in some scenarios, when collecting an unprocessed video stream, the image collection module needs to process the video stream by using the image processing module. The image processing module generally includes functions such as A/D conversion, signal processing, and image scaling. A/D conversion and signal processing technologies are well known to a person skilled in the art. In some embodiments, for example, when the image collection module is a CMOS sensor, a video collection module can implement the A/D conversion function. Therefore, the image processing module does not need to have the A/D conversion function. A result generated after A/D conversion and signal processing is digital image data. According to an embodiment, before the digital image data is sent to the processor, the image processing module processes the digital image data into at least one image of a specific size. In another embodiment, no scaling or resizing of an image and/or a video from a front end is required.

The processor 502 may be a general-purpose central processing unit (Central Processing Unit, CPU), a microprocessor, an artificial intelligence (Artificial Intelligence, AI) chip, a graphics processing unit (Graphics Processing Unit, GPU), a digital signal processor (Digital Signal Processor, DSP), or an application-specific integrated circuit (Application-Specific Integrated Circuit, ASIC), a field programmable gate array (Field Programmable Gate Array, FPGA) or another programmable logic device, a transistor logic device, a hardware component, or any combination thereof. Alternatively, the processor may be a combination implementing a computing function and/or a control function, for example, a combination including one or more microprocessors, a combination of a DSP and a microprocessor, or a combination of a CPU and a GPU or an AI chip.

During a specific implementation, in an embodiment, the smart camera may include a plurality of processors, for example, the processor 502 and a processor 508 in FIG. 5. Each of the processors may be a single-core (single-Core) processor or a multi-core (multi-Core) processor. The processor herein may be one or more devices, circuits, and/or processing cores for processing data (for example, a computer program instruction).

The communications interface 503 is an apparatus using transceiver, and is configured to communicate with another device or communications network, for example, an Ethernet, a radio access network (radio access network, RAN), or a wireless local area network (wireless local area networks, WLAN).

During a specific implementation, a wireless communications interface may be a Wi-Fi chip, a ZigBee chip, a Bluetooth chip, or a baseband chip that supports 2G/3G/4G/5G, and a fixed communications interface may be a component supporting an asymmetric digital subscriber line (ADSL), an x passive optical network (xPON), a packet transport network (PTN), or another wired access technology. With network evolution and technology development, another access mode may also be used. The communications interface may be a component that supports the another access mode. This is not limited herein.

The memory 504 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory 503 is not limited thereto. The memory 504 may exist independently and is connected to the processor 502 by using the communications bus 505. The memory 504 may alternatively be integrated with the processor 502.

The memory 504 is configured to store application program code for executing the technical solutions of this application, an intelligent application for performing intelligent video analysis, and deployment files for application scenarios. The processor is configured to execute the application program code and the intelligent application that are stored in the memory, to implement a function for a software-defined camera and intelligently analyze videos based on different scenarios.

With the system for a software-defined camera system provided above, an intelligent application can be flexibly deployed on a camera, or an intelligent application can be uninstalled and upgraded according to a requirement. This implements on-demand deployment and independent replacement of a camera function. In addition, a device management center stores a variety of intelligent applications to meet diversified surveillance scenario requirements, enhance universality of a smart camera, and implement a function of the software-defined camera.

The following further describes, with reference to FIG. 3 to FIG. 5, the system and the method for a software-defined camera, provided in the embodiments of this application from aspects such as deployment and update of an intelligent application and rollout of a new service.

Figure 6:
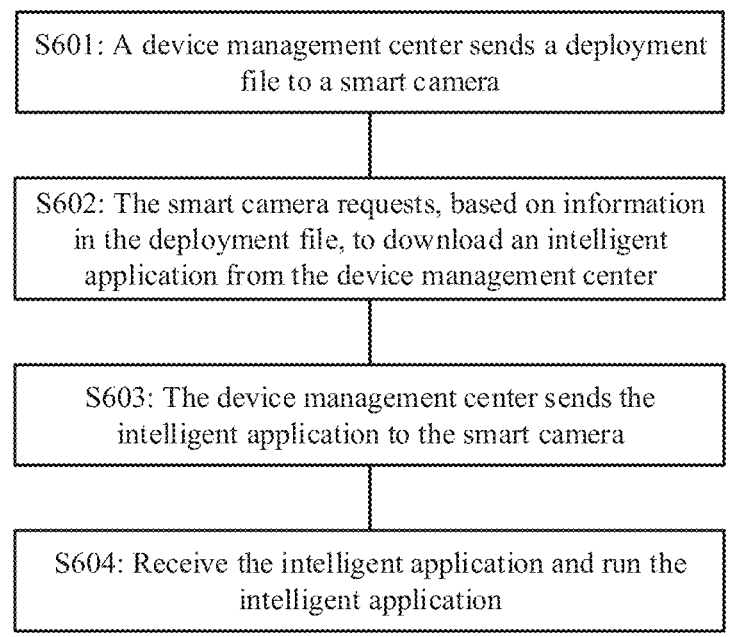
FIG. 6 is a schematic flowchart of a method for a software-defined camera according to an embodiment of this application.

FIG. 6 shows a process of deploying an intelligent application in this solution. The process includes the following steps.

S601: A device management center delivers a deployment file to a smart camera.

The deployment file is used to automatically deploy and adjust an intelligent application in a smart camera. The deployment file includes configuration information of an intelligent application for implementing an intelligent video analysis function in a specific surveillance scenario. The configuration information of the intelligent application may include information such as an identifier (for example, a software name or a software number), a storage location, and a display window of the intelligent application, and a dependency relationship between a plurality of intelligent applications. The dependency relationship between a plurality of intelligent applications may be information such as a combination relationship of the plurality of intelligent applications, an execution sequence of the plurality of intelligent applications, or a data transmission mode and an interface invocation mode between the intelligent applications.

Before deploying the intelligent application in the smart camera, the device management center can generate corresponding deployment files based on different intelligent video analysis functions to be implemented in different surveillance scenarios. When the intelligent application needs to be deployed on the smart camera, the device management center may obtain a corresponding deployment file through query based on information such as a location of the smart camera and an intelligent video analysis function that needs to be implemented, and send the deployment file to the smart camera.

During another implementation, the smart camera may also actively report a required intelligent analysis requirement to the device management center, and the device management center obtains a corresponding deployment file through query according to the required intelligent analysis requirement of the smart camera, and sends the deployment file to the smart camera. Optionally, based on the intelligent analysis requirement reported by the smart camera, the device management center may select an intelligent application required for implementing the intelligent analysis requirement, generate a corresponding deployment file in real time, and send the deployment file to the smart camera.

S602: The smart camera receives the deployment file, and requests, based on information in the deployment file, to download an intelligent application from the device management center.

The smart camera resolves the received deployment file, to obtain identification information such as a software name or software number of the intelligent application from the deployment file, and requests to download a corresponding intelligent application from the device management center.

Optionally, when a software repository and the deployment file of the device management center are stored in a distributed manner, the deployment file may further include a storage address of the intelligent application, and the smart camera may request the corresponding intelligent application from the software repository of the device management center based on the storage address in the deployment file.

S603: The device management center sends the corresponding intelligent application to the smart camera based on a request of the smart camera.

Before the device management center generates the deployment file for each surveillance scenario, the device management center stores various intelligent applications. Various intelligent video analysis functions or algorithms can be released to the software repository of the device management center by using independent software packages. The intelligent applications in the software repository may come from different developers.

S604: The smart camera receives the intelligent application and runs the intelligent application.

After receiving the intelligent application, the smart camera may sequentially provide, based on the dependency relationship between the intelligent applications in the deployment file, obtained image data to the intelligent application for processing, and finally obtain a required intelligent analysis result, to implement an intelligent video analysis function required in the surveillance scenario.

In the method for a software-defined camera provided in this embodiment of this application, on one hand, the device management center may receive intelligent applications of different developers, expand intelligent video analysis functions that can be implemented, and flexibly combine intelligent applications for different surveillance scenarios, to meet service requirements of different surveillance scenarios. On the other hand, different intelligent applications can be deployed on the smart camera based on different application scenarios and service requirements, and software is used to define functions of the smart camera, to implement software and hardware decoupling of the camera and expand functions that can be implemented by the smart camera and applicable surveillance scenarios for the smart camera.

Figure 7:
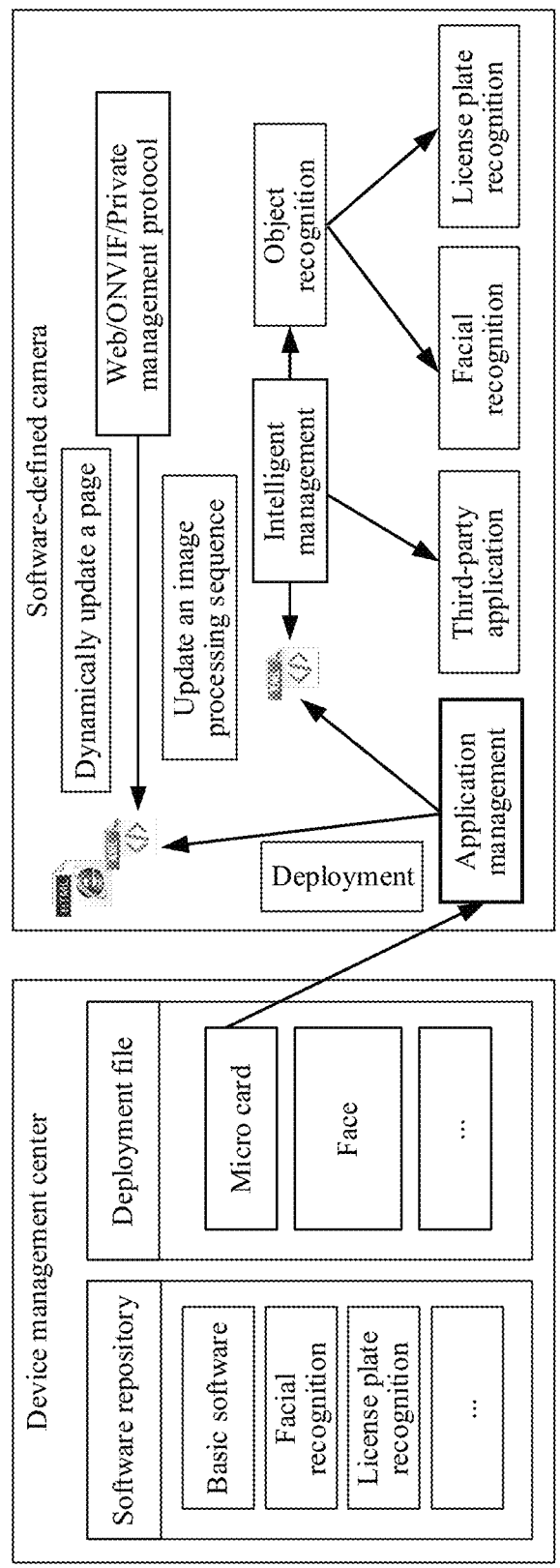
FIG. 7 is a schematic flowchart of another method for a software-defined camera according to an embodiment of this application.

FIG. 7 is another schematic diagram of a software-defined method according to an embodiment of this application. A processing procedure inside a smart camera is shown in the figure, and includes the following steps.

S701: The smart camera receives a deployment file sent by a device management center.

S702: The smart camera obtains an intelligent application from the device management center based on the deployment file.

Internal operations of the smart camera may be classified into application management and intelligent management. The application management mainly includes managing, by the smart camera, information about internal intelligent applications, and the intelligent management includes controlling, by the smart camera, execution of the intelligent applications. The smart camera queries information about intelligent applications in the deployment file, and obtains, from a software repository of the device management center based on an identifier and a corresponding storage address that are of an intelligent application and that are recorded in the deployment file, an intelligent application included in a list of intelligent applications in the deployment file.

S703: The smart camera executes the intelligent application.

After obtaining the intelligent application, the smart camera controls an execution sequence and a collaboration relationship of the intelligent application based on information such as an execution sequence and a dependency relationship of intelligent applications in the deployment file, and controls each intelligent application to read an image data stream in the smart camera.

Optionally, a user may configure the intelligent application by using an HTML page or an XML file.

In FIG. 7, an object recognition (motor vehicle recognition, non-motor vehicle recognition, and facial recognition) scenario is used as an example. There are three intelligent applications for this scenario: an object recognition intelligent application, a facial recognition intelligent application, and a license plate recognition intelligent application. After obtaining the three intelligent applications from the software repository of the device management center, the smart camera controls an execution sequence of the three intelligent applications based on a dependency relationship between the three intelligent applications. In other words, the smart camera may first perform object recognition, which is a prerequisite for facial recognition and license plate recognition. After object recognition is performed, facial recognition and license plate recognition are performed based on a recognition result. The facial recognition and the license plate recognition may be performed at the same time, or may be performed in sequence.

Optionally, if the smart camera supports parallel processing of a plurality of applications, when executing each intelligent application, the smart camera may read video data in a read-only sharing mode. In this way, it can be avoided that the video data needs to be replicated for a plurality of times and excessive resources are consumed because each intelligent application uses one piece of independent data. This can save memory, and prevent the applications from rewriting shared video data from affecting subsequent processing of the intelligent applications.

Figure 8:
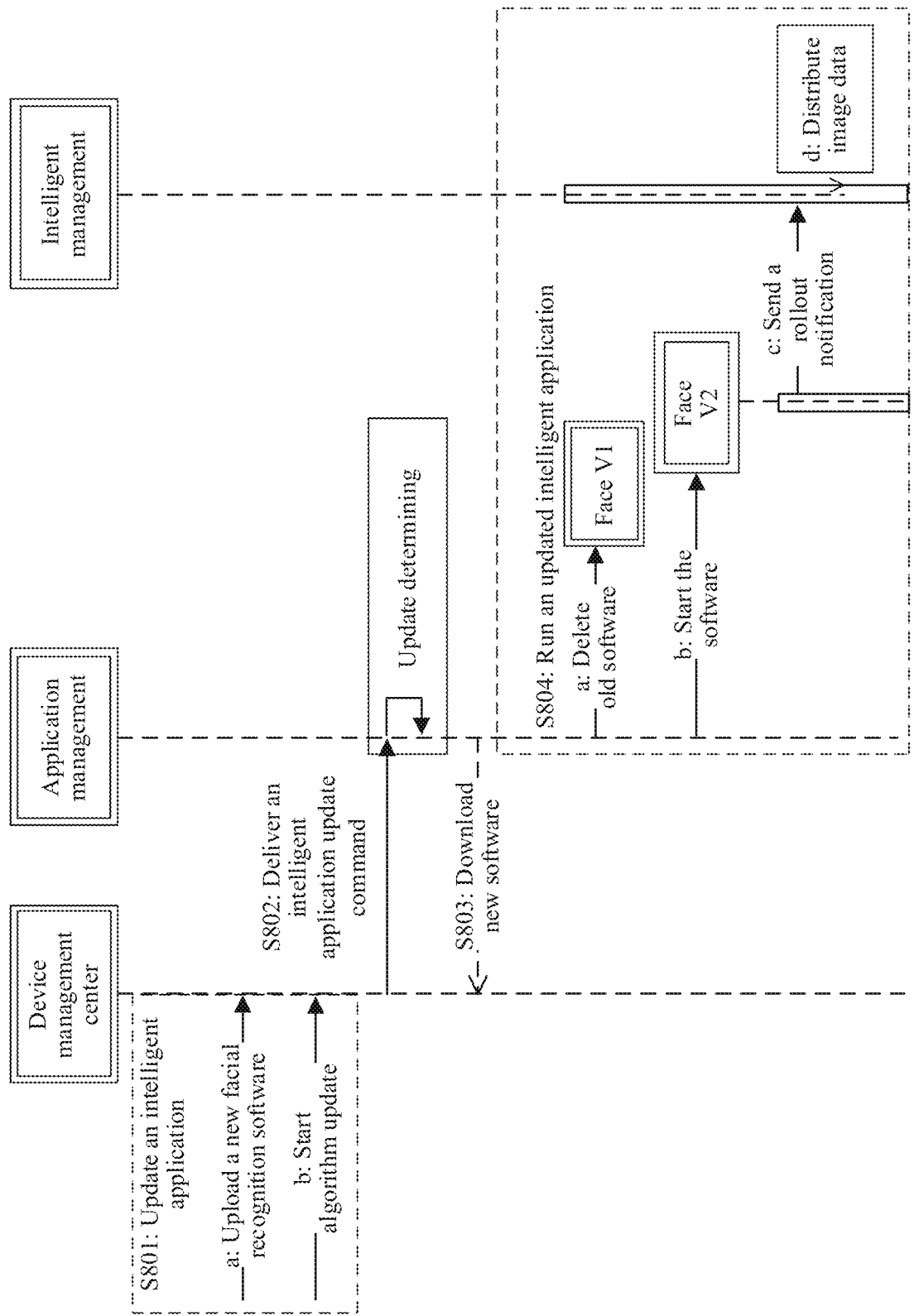
FIG. 8 is a schematic flowchart of a method for a software-defined camera when a software version is updated according to an embodiment of this application.

When an intelligent application for a scenario is updated in the device management center, the device management center needs to send an updated intelligent application to a corresponding smart camera in the scenario. FIG. 8 shows the process, including the following steps.

S801: Update a software package of an intelligent application in a device management center.

A developer of algorithm or intelligent analysis software may upload software of a latest version to a software repository of the device management center. The device management center may mark a version of an updated intelligent application.

After updating the intelligent application, the device management center may update a deployment file that includes a surveillance scenario of the intelligent application, and update information such as an identifier, a version number, and a storage address that are of the intelligent application and that are in the deployment file, and a dependency relationship between the intelligent application and another intelligent application.

S802: The device management center delivers an intelligent application update command to a smart camera.

After an intelligent application in the software repository of the device management center is updated, the device management center may query deployment information of smart cameras to find out smart cameras that are running the intelligent application, and send the intelligent application update command to these smart cameras. The intelligent application update command may include information such as an identifier (for example, a name, a number, and a version number) of an intelligent application whose version is updated, a storage address of an intelligent application that needs to be updated, and a dependency relationship between the intelligent application that needs to be updated and another intelligent application.

During an implementation, the device management center may send an updated deployment file to the smart cameras, to notify the smart cameras of the intelligent application that needs to be updated.

S803: The smart camera downloads, from the device management center according to the received intelligent application update command, the intelligent application that needs to be updated.

After receiving the intelligent application update command, the smart camera queries intelligent application information in the intelligent application update command, identifies an updated intelligent application, and sends, to the device management center, a request message for obtaining the updated intelligent application. The request sent by the smart camera to the device management center includes information, for example, an identifier of the updated intelligent application.

Optionally, if the device management center sends an updated deployment file to the smart camera, after receiving the updated deployment file, the smart camera compares the new deployment file with an old deployment file or an existing intelligent application of the smart camera, to identify the information about the updated intelligent application, and then requests to download the updated intelligent application from the device management center.

S804: The smart camera runs the updated intelligent application.

After receiving the updated intelligent application, the smart camera may delete an old intelligent application according to a requirement, and update information about the updated intelligent application, such as a number or a version number of the intelligent application. The smart camera starts the new intelligent application. After being started, the new intelligent application registers with a system. The smart camera may adjust an execution mode and an execution sequence of intelligent applications based on a dependency relationship between the intelligent applications. When the updated intelligent application is executed, the smart camera distributes image data to the updated intelligent application for processing.

In the method in the embodiment shown in FIG. 8, after an intelligent application in the device management center is updated, the device management center may notify information about the updated intelligent application to a smart camera that is deployed with the intelligent application. The smart camera may select to update a corresponding intelligent application according to a requirement, and obtain the intelligent application from the device management center. By performing the foregoing steps, the smart camera can timely learn an update status of an intelligent application in the surveillance scenario, and update the intelligent application according to a requirement. This can timely improve intelligent analysis performance of the camera.

Figure 9:
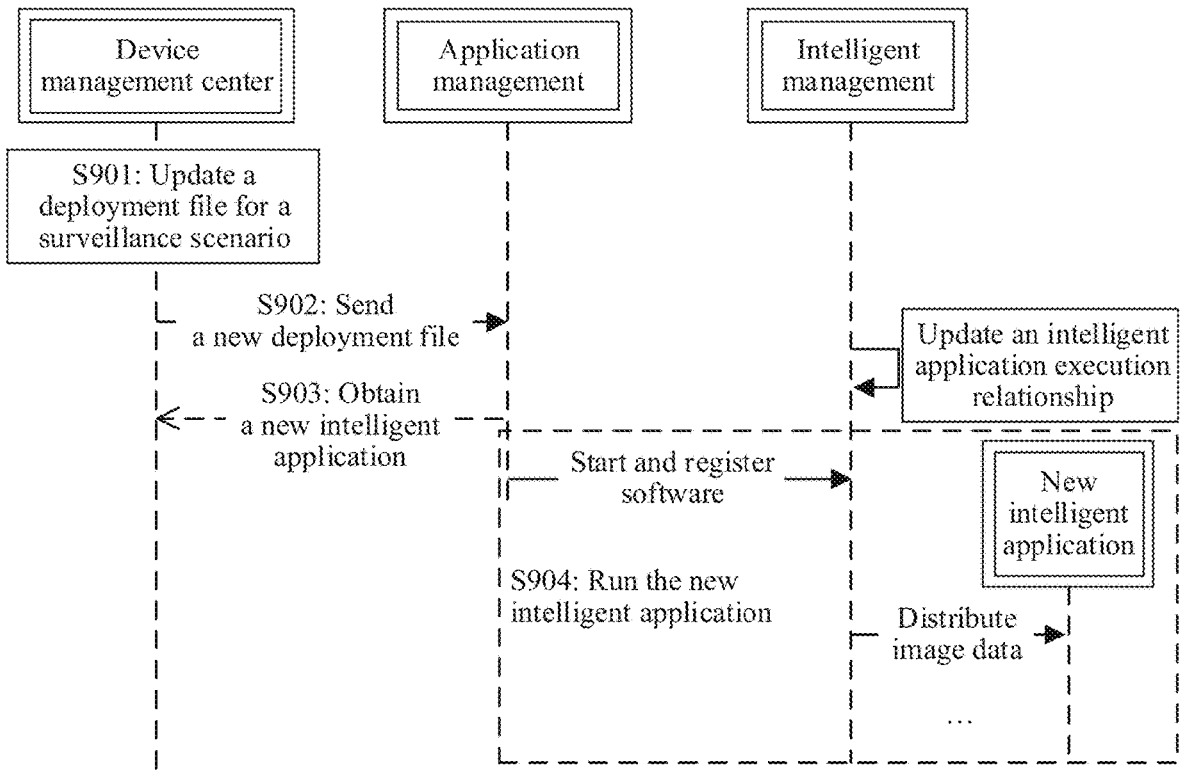
FIG. 9 is a schematic flowchart of a method for a software-defined camera at rollout of a new intelligent application according to an embodiment of this application.

When a new service requirement arises in a surveillance scenario, independent rollout of a new intelligent video analysis service is needed without interrupting an intelligent application that runs properly on the smart camera. FIG. 9 shows a process in which a device management center deploys a new intelligent application to a smart camera. The process includes the following steps.

S901: Update a deployment file for a surveillance scenario in the device management center.

In some cases, a new intelligent analysis service needs to be added to a surveillance scenario to implement a new function. In this case, a new intelligent application may be uploaded to the device management center, and then the device management center deploys the new intelligent application to a corresponding smart camera. In another solution, a new intelligent application may be added to an original intelligent application for the surveillance scenario, to implement a required new intelligent analysis service. In each of the foregoing two manners, the deployment file for the surveillance scenario needs to be updated. In the latter solution, the new intelligent application and a dependency relationship between the new intelligent application and the original intelligent application may be added to an original deployment file.

Optionally, the smart camera may actively report a new intelligent application requirement to the device management center. According to the intelligent application requirement reported by the smart camera, the device management center may re-deploy an intelligent application required by the application scenario and update the deployment file for the surveillance scenario.

S902: The device management center sends a new deployment file to the smart camera.

After a deployment file for a surveillance scenario is updated, the device management center can query smart cameras in the surveillance scenario and send the updated deployment file to these smart cameras. The updated deployment file includes information such as an identifier and a storage address of a new intelligent application.

During another implementation, the device management center may alternatively send only information about the new intelligent application, such as a software name, a software number, and a storage address of the intelligent application, and a dependency relationship between the intelligent application and another intelligent application, to the smart camera in a form of an intelligent application update command.

S903: The smart camera obtains the new intelligent application from the device management center based on the received deployment file.

After receiving the new deployment file, the smart camera queries information about intelligent applications in the new deployment file, and compares the information with an existing deployment file or an intelligent application stored in the smart camera. If it is found that the deployment file includes a new intelligent application, the smart camera needs to send a request for obtaining the new intelligent application to the device management center. The request sent by the smart camera to the device management center may include information, for example, an identifier of the intelligent application that needs to be obtained. After receiving the request sent by the smart camera, the device management center sends a corresponding intelligent application to the smart camera.

Optionally, if the device management center sends an intelligent application update command, after receiving the intelligent application update command, the smart camera identifies the new intelligent application based on information about intelligent applications in the intelligent application update command, and then obtains the new intelligent application from the device management center.

Optionally, the smart camera updates information about the intelligent application in the smart camera based on the information about the intelligent applications in the new deployment file. It should be noted that the smart camera may alternatively update the information about the intelligent application in the smart camera after receiving the new intelligent application.

S904: The smart camera runs the new intelligent application.

In addition to the information such as identifiers and storage locations of the intelligent applications, the new deployment file further includes a dependency relationship between the intelligent applications, for example, an execution sequence, parallel execution, or serial execution of the intelligent applications. The smart camera updates the execution sequence and the execution mode of the intelligent applications based on the dependency relationship between the intelligent applications in the deployment file and executes the intelligent applications.

After receiving the new intelligent application, the smart camera starts the new intelligent application. After being started, the new intelligent application registers in a system of the smart camera. The smart camera may adjust the execution mode and the execution sequence of the intelligent applications based on a dependency relationship between updated intelligent applications. When an updated intelligent application is executed, the smart camera distributes image data to the new intelligent application for processing.

In the method in the embodiment shown in FIG. 9, when a new intelligent application is needed in a surveillance scenario, the device management center updates a deployment file for the surveillance scenario and adds information about the new intelligent application to the deployment file. The device management center sends a new deployment file to the smart camera. The smart camera may find, based on the new file, a new intelligent application that needs to be obtained. An application management module of the smart camera updates the information about the intelligent application in the smart camera, and updates a dependency relationship between intelligent applications in the surveillance scenario, and after obtaining the new intelligent application, controls an execution sequence and an execution mode of the intelligent applications. By performing the foregoing steps, the smart camera may update the intelligent application of the smart camera without affecting existing intelligent analysis and a basic service of the camera as much as possible, to expand an intelligent analysis capability of the smart camera.

The foregoing mainly describes the method provided in this embodiment of this application from perspectives of interaction between the device management center and the smart camera and operations performed inside the smart camera. It may be understood that, to implement the foregoing functions, the device management center and a control device include corresponding hardware structures and/or software modules for performing the functions. A person of ordinary skill in the art should easily be aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the device management center and the smart camera may be divided into functional modules based on the foregoing method examples. For example, functional modules may be divided by function, or two or more functions may be integrated into one processing module. The integrated module may be implemented in a form of hardware, or may be implemented in a form of a software functional module. It should be noted that, in this embodiment of this application, module division is exemplary, and is merely a logical function division. In actual implementation, another division manner may be used.

Figure 10:
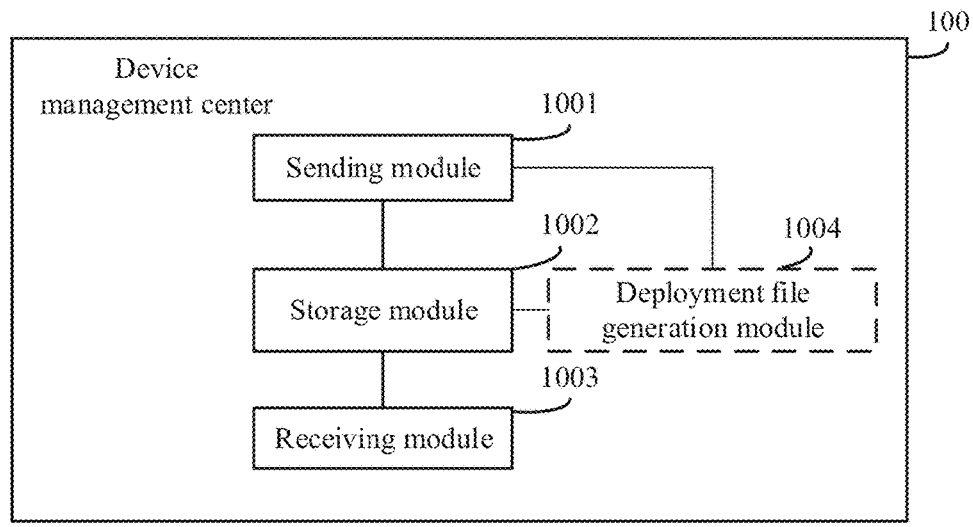
FIG. 10 is a schematic diagram of a structure of a device management center according to an embodiment of this application.

For example, if the functional modules are divided by function, FIG. 10 shows a possible schematic diagram of a structure of the device management center in the foregoing embodiments. The device management center 100 includes a sending module 1001, a storage module 1002, and a receiving module 1003. The sending module 1001 is configured to send an intelligent application and a deployment file for a specific surveillance scenario to a smart camera. The deployment file includes intelligent application configuration information in the specific surveillance scenario. The storage module 1002 is configured to store the intelligent application and a deployment file for each surveillance scenario. The receiving module 1003 is configured to receive a request message of the smart camera.

Optionally, according to an intelligent analysis requirement of the surveillance scenario or when there is an updated version for the intelligent application, an intelligent application developer may send a developed intelligent application to the device management center. The receiving module 1003 is further configured to receive an intelligent application sent from outside.

If the receiving module 1003 receives a new version of an existing intelligent application, the storage module 1002 deletes the intelligent application of an old version, and updates information about the intelligent application to the intelligent application of the new version.

Optional, the device management center further includes a deployment file generation module 1004, configured to generate a deployment file. The device management center may organize stored intelligent applications based on a requirement of the surveillance scenario and generate a deployment file, to implement a required intelligent video analysis function. If a quantity of intelligent applications in a surveillance scenario increases or a version of an intelligent application is updated, the deployment file generation module may update a deployment file of the surveillance scenario.

During another implementation, if a quantity of intelligent applications in a surveillance scenario increases or a version of an intelligent application is updated, the sending module 1001 may send an intelligent application update command to the smart camera. The intelligent application update command includes information about an intelligent application that needs to be obtained.

All related content of the steps in the foregoing method embodiments may be cited in function descriptions of corresponding functional modules. Details are not described herein again.

In this embodiment, the device management center is presented in a form in which functional modules are divided by function, or the device management center is presented in a form in which functional modules are divided in an integrated manner. The "module" herein may be an application-specific integrated circuit (Application-Specific Integrated Circuit, ASIC), a circuit, a processor executing one or more software or firmware programs, a memory, an integrated logic circuit, and/or another component that can provide the foregoing function. In a simple embodiment, a person skilled in the art may figure out that the device management center 100 may be in the form shown in FIG. 4. For example, the sending module 1001, the storage module 1002, the receiving module 1003, and the deployment file generation module 1004 in FIG. 10 may be implemented by using the processor 401 and the memory 403 in FIG. 4. Specifically, the storage module 1002 may be implemented by using the memory 403 in FIG. 4. The sending module 1001, the receiving module 1003, and the deployment file generation module 1004 may be executed by the processor 401 by invoking the application program code stored in the memory 403. This is not limited in this embodiment of this application.

The device management center provided in this embodiment of this application may be configured to perform the foregoing method for a software-defined camera. Therefore, for a technical effect that can be achieved by the device management center, refer to the foregoing method embodiments. Details are not described herein again.

Figure 11:
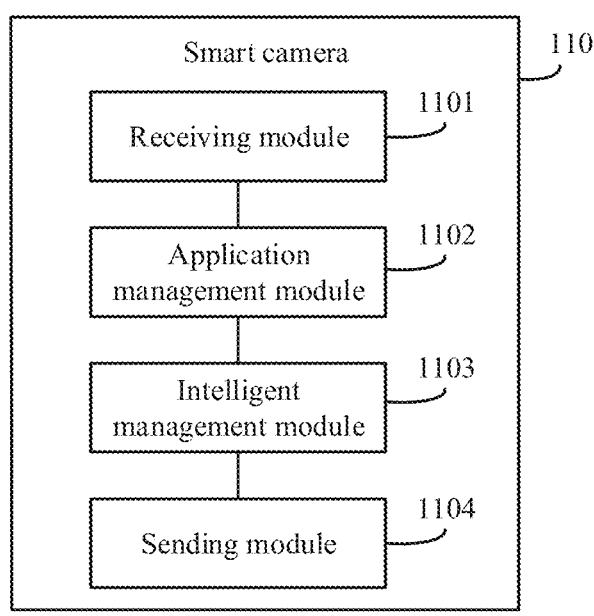
FIG. 11 is a schematic diagram of a structure of another device management center according to an embodiment of this application.

For example, if the functional modules are divided by function, FIG. 11 shows a possible schematic diagram of a structure of the smart camera in the foregoing embodiment. The smart camera 110 includes a receiving module 1101, an application management module 1102, an intelligent management module 1103, and a sending module 1104. The receiving module 1101 is configured to receive a deployment file from a device management center. The deployment file includes intelligent application configuration information in a specific surveillance scenario. The application management module 1102 is configured to obtain information included in the deployment file, such as a list of intelligent applications and a dependency relationship between the intelligent applications. The intelligent management module 1103 is configured to execute an intelligent application based on the dependency relationship between the intelligent applications in the deployment file. The dependency relationship between the intelligent applications includes information such as an execution sequence and an execution mode of the intelligent applications. The sending module 1104 is configured to send a request message for obtaining an intelligent application to a device management center.

Optionally, the application management module 1102 may compare the information about the intelligent applications in the deployment file with an existing intelligent application of the smart camera, to identify an intelligent application that needs to be obtained. If the application management module 1102 finds that the list of the intelligent applications in the deployment file includes a new intelligent application, the sending module 1104 sends, to the device management center, a request message for obtaining the new intelligent application. The new intelligent application refers to a new version of an intelligent application that is in the smart camera and that is included in the list of the intelligent applications in the deployment file, or refers to an intelligent application that is not obtained by the smart camera and that is included in the list of the intelligent applications in the deployment file. If the smart camera receives an intelligent application of a new version, the application management module 1102 may delete the intelligent application of an old version and update information about the intelligent application.

Optionally, the receiving module 1101 is further configured to receive an intelligent application update command sent by the device management center. The intelligent application update command includes information about an intelligent application that needs to be updated. The application management module 1102 is further configured to identify, according to the intelligent application update command, the intelligent application that needs to be obtained. The sending module 1104 is further configured to send, to the device management center, a request message for obtaining the intelligent application that needs to be obtained. The intelligent application that needs to be updated includes a new intelligent application for the surveillance scenario or an existing intelligent application whose version is updated.

Optionally, if the application management module 1102 finds that an intelligent application is deleted from the deployment file, the intelligent management module 1103 stops the deleted intelligent application, and the application management module 1102 may further delete the deleted intelligent application from the smart camera.

Optionally, the intelligent management module 1103 controls an intelligent application to read video data in a read-only sharing mode.

All related content of the steps in the foregoing method embodiments may be cited in function descriptions of corresponding functional modules. Details are not described herein again.

In this embodiment, the smart camera is presented in a form in which functional modules are divided by function, or the smart camera is presented in a form in which functional modules are divided in an integrated manner. The "module" herein may be an application-specific integrated circuit (Application-Specific Integrated Circuit, ASIC), a circuit, a processor executing one or more software or firmware programs, a memory, an integrated logic circuit, and/or another component that can provide the foregoing function. In a simple embodiment, a person skilled in the art may figure out that the smart camera 110 may be in the form shown in FIG. 5. For example, the sending module 1101, the application management module 1102, the intelligent management module 1103, and the sending module 1104 in FIG. 11 may be implemented by using the processor 502 and the memory 504 in FIG. 5. Specifically, the receiving module 1101, the application management module 1102, the intelligent management module 1103, and the sending module 1104 may be executed by the processor 502 by invoking the application program code stored in the memory 504. This is not limited in this embodiment of this application.

The smart camera provided in this embodiment of this application may be configured to perform the foregoing method for a software-defined camera. Therefore, for a technical effect that can be achieved by the smart camera, refer to the foregoing method embodiments. Details are not described herein again.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid State Disk, SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for a device management center, wherein the method comprises:
   obtaining, by a device management center, a deployment file based on information of a smart camera at a separate location from the device management center, an intelligent video analysis function that needs to be implemented, or an intelligent analysis requirement of the smart camera;
   wherein the device management center stores a plurality of deployment files corresponding to various surveillance scenarios;
   sending, by the device management center, the deployment file to the smart camera, wherein the deployment file comprises intelligent application configuration information applicable to a specific surveillance scenario;
   receiving, by the device management center, a request message for obtaining an intelligent application by the smart camera; and
   sending, by the device management center, the intelligent application to the smart camera,
   wherein the device management center further performs the above steps for one or more other smart cameras.

2. The method according to claim 1, wherein before the device management center sends the deployment file to the smart camera, the device management center receives the intelligent application sent from a device other than the device management center.

3. The method according to claim 1, wherein before the device management center sends the deployment file to the smart camera, the device management center generates the plurality of deployment files corresponding to various surveillance scenarios.

4. The method according to claim 3, further comprising determining, by the device management center, that a quantity of intelligent applications for the surveillance scenario increases or an intelligent application for the specific surveillance scenario changes, and in response, updating, by the device management center, a deployment file corresponding to the specific surveillance scenario.

5. The method according to claim 3, further comprising determining, by the device management center, that a quantity of intelligent applications for the surveillance scenario increases or an intelligent application for the specific surveillance scenario changes, and
   in response, sending, by the device management center, an intelligent application update command to the smart camera, wherein the intelligent application update command comprises information about an intelligent application that needs to be updated.

6. The method according to claim 5, wherein the method comprises:
   receiving, by the smart camera, the intelligent application update command sent by the device management center;

identifying, by the smart camera, according to the intelligent application update command, an intelligent application that needs to be updated; and sending, by the smart camera, to the device management center, a request message for obtaining the intelligent application that needs to be updated.

7. The method according to claim 1, wherein the method further comprises:

receiving, by the smart camera, the deployment file sent by the device management center;

sending, by the smart camera based on the intelligent application configuration information in the deployment file, the request message for obtaining the intelligent application to the device management center; and receiving, by the smart camera, the intelligent application sent by the device management center.

8. The method according to claim 7, wherein the sending, by the smart camera based on the intelligent application configuration information in the deployment file, the request message for downloading the intelligent application to the device management center comprises:

obtaining, by the smart camera based on the intelligent application configuration information in the deployment file, a list of intelligent applications comprised in the deployment file;

comparing, by the smart camera, the list of the intelligent applications comprised in the deployment file with an existing intelligent application on the smart camera, to identify the intelligent application that needs to be obtained; and sending, by the smart camera to the device management center, the request message for obtaining the intelligent application that needs to be obtained.

9. The method according to claim 1, wherein after receiving the intelligent application sent by the device management center, the smart camera executes the intelligent application based on the intelligent application configuration information.

10. The method according to claim 9, wherein when executing the intelligent application, the smart camera controls the intelligent application to read video data in a read-only sharing mode.

11. The method according to claim 1, wherein the intelligent application configuration information comprises at least one of:

a software identifier, a storage address of software, a display window, and a dependency relationship between a plurality of intelligent applications.

12. The method according to claim 1, wherein:

the intelligent application is a vehicle recognition intelligent application, a facial recognition intelligent application, or a license plate recognition intelligent application.

13. A device management center, comprising a processor and a memory, wherein the memory is configured to store instructions, and when the instructions are executed by the processor, the processor is configured to:

obtain a deployment file based on information of a smart camera at a separate location from the device management center, an intelligent video analysis function that needs to be implemented, or an intelligent analysis requirement of the smart camera; wherein the device management center stores a plurality of deployment files corresponding to various surveillance scenarios;

send the deployment file to the smart camera, wherein the deployment file comprises intelligent application configuration information applicable to a specific surveillance scenario;

receive a request message for obtaining an intelligent application by the smart camera; and send the intelligent application to the smart camera, wherein the device management center is further configured to perform the above steps for one or more other smart cameras.

14. The device management center according to claim 13, wherein when the instructions are executed by the processor, the processor is configured to:

receive the intelligent application sent from a device other than the device management center before the device management center sends the deployment file to the smart camera.

15. The device management center according to claim 13, wherein when the instructions are executed by the processor, the processor is configured to:

generate the plurality of deployment files corresponding to various surveillance scenarios before the device management center sends the deployment file to the smart camera.

16. The device management center according to claim 15, wherein when the instructions are executed by the processor, the processor is configured to:

update a deployment file corresponding to the specific surveillance scenario when a quantity of intelligent applications for the surveillance scenario increases or an intelligent application for the specific surveillance scenario changes.

17. The device management center according to claim 13, wherein when the instructions are executed by the processor, the processor is configured to:

send an intelligent application update command to the smart camera, when a quantity of intelligent applications for the surveillance scenario increases or an intelligent application for the specific surveillance scenario changes, wherein the intelligent application update command comprises information about an intelligent application that needs to be updated.

18. The device management center according to claim 13, wherein the intelligent application configuration information comprises at least one of:

a software identifier, a storage address of software, a display window, and a dependency relationship between a plurality of intelligent applications.

19. The device management center according to claim 13, wherein:

the intelligent application is a vehicle recognition intelligent application, a facial recognition intelligent application, or a license plate recognition intelligent application.

* * * * *